US009260331B2

(12) United States Patent
Park

(10) Patent No.: US 9,260,331 B2
(45) Date of Patent: Feb. 16, 2016

(54) WATER CIRCULATING DEVICE INSTALLED IN A PARK OR LAKE

(75) Inventor: Myoung-ha Park, Anyang-si (KR)

(73) Assignee: ECOCO CO., LTD., Hwaseong-si, Gyeonggi-do (KR)

( * ) Notice: Subject to any disclaimer, the term of this patent is extended or adjusted under 35 U.S.C. 154(b) by 267 days.

(21) Appl. No.: 13/985,875

(22) PCT Filed: Feb. 15, 2012

(86) PCT No.: PCT/KR2012/001129
§ 371 (c)(1),
(2), (4) Date: Aug. 16, 2013

(87) PCT Pub. No.: WO2012/111972
PCT Pub. Date: Aug. 23, 2012

(65) Prior Publication Data
US 2013/0319921 A1    Dec. 5, 2013

(30) Foreign Application Priority Data

Feb. 16, 2011    (KR) .................. 10-2011-0013734

(51) Int. Cl.
C02F 7/00    (2006.01)
C02F 1/74    (2006.01)
B01F 3/04    (2006.01)
(Continued)

(52) U.S. Cl.
CPC .............. *C02F 1/74* (2013.01); *B01F 3/04773* (2013.01); *B01F 13/0049* (2013.01); *C02F 3/14* (2013.01); *C02F 3/165* (2013.01); *C02F 7/00* (2013.01); *C02F 2201/009* (2013.01);
(Continued)

(58) Field of Classification Search
CPC .............. C02F 1/74; C02F 3/165; C02F 7/00; B01F 3/04035; B01F 3/04773; B01F 13/0049
USPC ........ 210/170.05, 170.06, 242.2; 261/91, 120
See application file for complete search history.

(56) References Cited

U.S. PATENT DOCUMENTS 3,462,132 A * 8/1969 Kaelin ........................ 261/120
3,709,470 A * 1/1973 Auler et al. ................. 210/242.2
(Continued)

FOREIGN PATENT DOCUMENTS

JP         04-198687 A     7/1992
KR    2002-0035434 A     5/2002
(Continued)

OTHER PUBLICATIONS

International Search Report in International Application No. PCT/KR2012/001129, dated Sep. 5, 2012.

*Primary Examiner* — Christopher Upton
(74) *Attorney, Agent, or Firm* — Park, Kim & Suh, LLC

(57) ABSTRACT

Disclosed is a water circulating device using sunlight which is installed in a park or a lake and circulates water to improve the quality of water. The water circulating device includes an expandable corrugated tube unit for introducing water within a water area to disperse the water to an upper stratum of the water area, a unit frame for supporting the expandable corrugated tube unit, a plurality of barge units for providing buoyancy to the expandable corrugated tube unit and the unit frame, an impeller for dispersing the water in the expandable corrugated tube unit to outside the expandable corrugated tube unit, and a torque provider for providing torque to the impeller.

14 Claims, 9 Drawing Sheets

(51) Int. Cl.
  *B01F 13/00* (2006.01)
  *C02F 3/16* (2006.01)
  *C02F 3/14* (2006.01)
(52) U.S. Cl.
  CPC .............. *Y02W 10/15* (2015.05); *Y02W 10/33* (2015.05); *Y02W 10/37* (2015.05)

(56) References Cited

U.S. PATENT DOCUMENTS 3,802,673 A * 4/1974 Ross ............................ 261/91
3,811,662 A * 5/1974 Kaelin ......................... 261/91
4,157,304 A * 6/1979 Molvar ..................... 210/242.2
4,287,060 A * 9/1981 Coggins .................... 210/242.2
4,882,099 A * 11/1989 Durda et al. ............. 210/242.2
2007/0295672 A1* 12/2007 Tormaschy et al. ...... 210/170.05

FOREIGN PATENT DOCUMENTS

| | | |
|---|---|---|
| KR | 10-0965784 B1 | 6/2010 |
| KR | 10-2010-0134947 A | 12/2010 |
| WO | 94-24058 A1 | 10/1994 |

* cited by examiner

WATER CIRCULATING DEVICE INSTALLED IN A PARK OR LAKE

CROSS-REFERENCE TO RELATED APPLICATIONS

This application is the National Stage filing under 35 U.S.C. 371 of International Application No. PCT/KR2012/001129, filed on Feb. 15, 2012, which claims the benefit of Korean Patent Application No. 10-2011-0013734, filed on Feb. 16, 2011, the contents of which are all hereby incorporated by reference herein in their entirety.

TECHNICAL FIELD

The present invention relates, in general, to a water circulating device using sunlight, which is installed in a park or a lake and, more particularly, to a water circulating device using sunlight, which circulates water in a simple structure to be able to contribute to improvement in the quality of water and is installed in a park or a lake.

BACKGROUND ART

With the industrial development, industrial water and domestic water have been used more and more. The amount of discharge of various kinds of sewage and wastewater caused by such use has also increased.

Industrial water and domestic water should be treated into clean water and then discharged to rivers. However, this is not in line with the reality. As a result, pollution of rivers or lakes is increasing.

Various organic pollutants flowing into the rivers or lakes cause an abnormal multiplication of various microorganisms including algae. For this reason, a shortage of dissolved oxygen occurs, and the self-purification power of water is lost. As a result, the water becomes foul.

For this reason, various efforts are being made to improve water quality using a water circulating method. However, due to structural limits or power supply limits, commercialization has not yet proceeded favorably. Thus, a countermeasure against this is required.

DISCLOSURE

Technical Problem

Accordingly, the present invention has been made keeping in mind the above problems occurring in the prior art, and an object of the present invention is to provide a water circulating device using sunlight, which circulates water in a simple structure so as to be able to contribute to improvement in the quality of water and is installed in a park or a lake.

Another object of the present invention is to provide a water circulating device using sunlight, which is installed in a simple structure in a park or a lake so as to be able to be applied for landscape architecture due aesthetic geometry.

Technical Solution

In order to accomplish the above objects, the present invention provides a water circulating device installed in a park or a lake, which includes: an expandable corrugated tube unit having an expandable corrugated tube body that is provided so as to be able to adjust a length in a vertical direction of a water area, has at least one inlet into which water located at a lower stratum of the water area flows, and is formed in a pipe shape, and a water disperser that is provided at an upper portion of the expandable corrugated tube body and disperses the water supplied from the expandable corrugated tube body to an upper stratum of an neighboring water area corresponding to an upper region of the expandable corrugated tube body; a unit frame supporting the expandable corrugated tube unit; a plurality of barge units that are radially connected outside the unit frame around the expandable corrugated tube body and provide buoyancy to the expandable corrugated tube unit and the unit frame; an impeller that is rotatably disposed at the expandable corrugated tube unit and disperses the water from the expandable corrugated tube unit to outside the expandable corrugated tube unit; and a torque provider providing torque to the impeller. The impeller includes a shaft having a deicer on at least one region and dispersion blades that are connected to the shaft and disperse the water in a radial outward direction.

Here, each of the barge units may include a floating tank that has a tub structure and provides substantial buoyancy, a barge unit support that is connected to the unit frame, and a free rotor that is provided on a region where the floating tank and the barge unit support are connected and freely rotates the floating tank relative to the barge unit support.

Further, the floating tank may be manufactured in a cylindrical or conical structure, and the barge unit support may include a transverse bracket connected to the unit frame in a transverse direction and a tank connecting shaft connected to the transverse bracket in a longitudinal direction.

The free rotor may include a disk provided at an upper end of the tank connecting shaft and a rotary housing that is connected to the floating tank at a lower end of the floating tank so as to prevent separation of the disk and is rotatable relative to the disk.

Further, the tank connecting shaft may be connected so as to be rotatable relative to the transverse bracket by a bearing.

Also, each of the barge units may further include a buoyancy adjustor that is provided for the floating tank and which adjusts the buoyancy of the floating tank.

Here, the buoyancy adjustor may include a socket forming a water inlet in the upper end of the floating tank and a plug bolt removably coupled to the socket.

The impeller may include a shaft having a deicer on at least one region and dispersion blades that are connected to the shaft and disperse the water in a radial outward direction.

Further, the deicer may include a shaft housing that is disposed on a radial outer side of the shaft and protects the shaft from the outside, retainers that maintain an air tight gap between the shaft housing and the shaft, and an anti-freezing filler that is filled in a region between the shaft housing and the shaft.

The torque provider may include a driving motor that rotates the impeller, a battery that supplies power for driving the driving motor, and an independent power unit that generates electricity in itself and charges the battery.

The independent power unit may include at least one solar cell that generates electricity from solar energy based on sunlight or solar heat, and a wind power unit that generates electricity from wind energy based on a wind.

The water circulating device may further include a controller controlling the torque provider.

Further, the water circulating device may further include a fine bubble generator generating fine bubbles toward the expandable corrugated tube unit and a compressor providing air to the fine bubble generator.

Advantageous Effects

According to the present invention, the water circulating device circulates water in a simple structure, and thus has the effect of contributing to improvement of water quality.

BEST MODE

Figure 1:
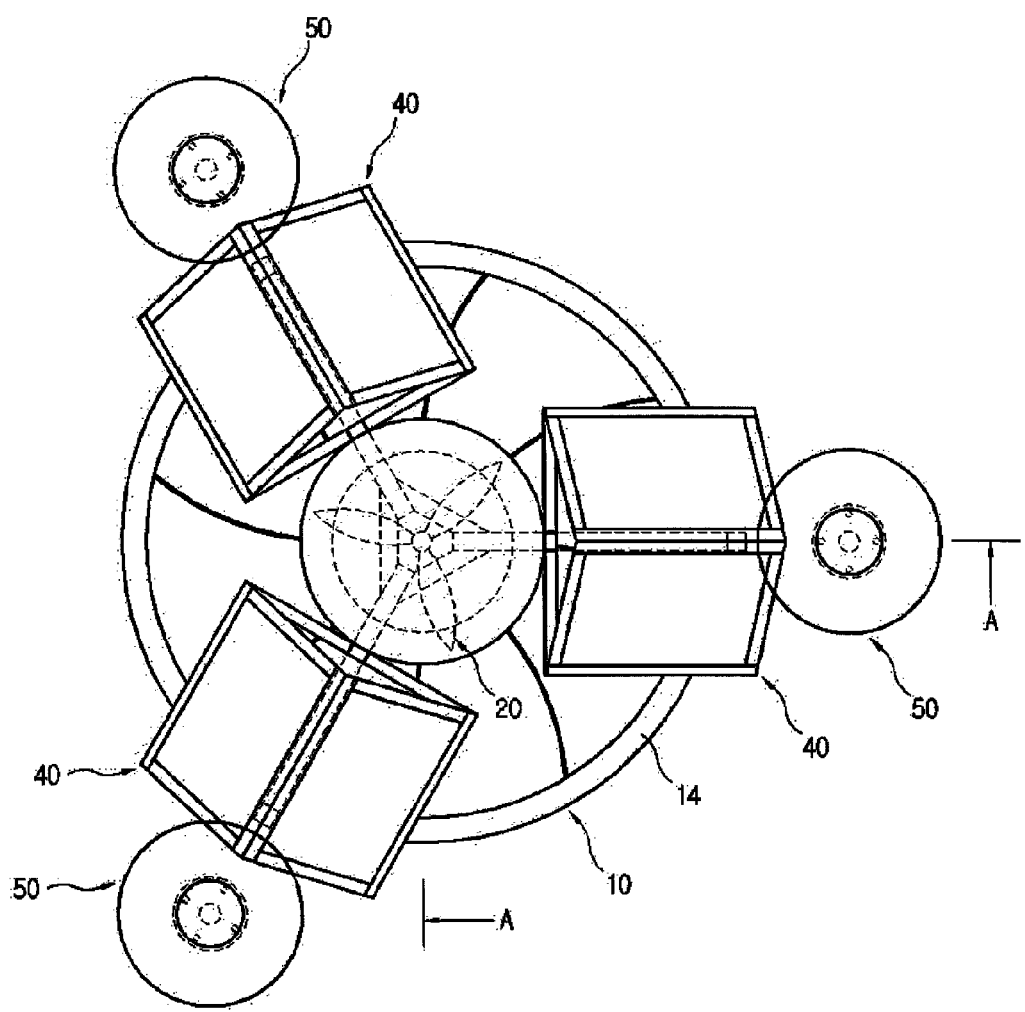
FIG. 1 is a top view showing a water circulating device which is installed in a park or a lake in accordance with a first embodiment of the present invention.

The foregoing and other objects, features, and advantages of the present invention will be clearly understood from the more particular description of exemplary embodiments of the present invention. The present invention may, however, be embodied in different forms and should not be construed as limited to the embodiments set forth herein. Rather, these embodiments are provided so that this disclosure is thorough and complete and fully conveys the present invention to those skilled in the art.

It will be understood that, when an element is referred to as being on another element, the element can be directly on the other element, or intervening elements may be present. Further, in the drawings, the sizes of elements may be exaggerated for effective description of technical contents.

Embodiments are described herein with reference to cross-sectional illustrations that are schematic illustrations of idealized embodiments. In the drawings, the sizes and relative sizes of layers and regions may be exaggerated for effective description of technical contents. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an etched region illustrated as a rectangle will have rounded or curved features. Thus, the regions illustrated in the figures are schematic in nature, and their shapes are not intended to illustrate the specified shape of a region of a device and are not intended to limit the scope of the present invention. It will be understood that, although the terms first, second, etc. may be used herein to describe various elements, these elements should not be limited by these terms. These terms are only used to distinguish one element from another. The embodiments described and illustrated herein include their complementary embodiments.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, do not preclude the presence or addition of one or more other elements.

Hereinafter, the present invention will be described in detail with reference to the accompanying drawings. In the description of the specific embodiments below, various characteristic contents are given to describe the invention in greater detail and to help understanding of the invention. However, those having such knowledge in this field as to understand the invention can perceive that the invention can be carried out without the various characteristic contents. It is previously noted that, in a certain case, the portions that are generally known in the description of the invention and are largely irrelevant to the invention are not described to prevent confusion without any particular reason in the description of the invention.

Figure 2:
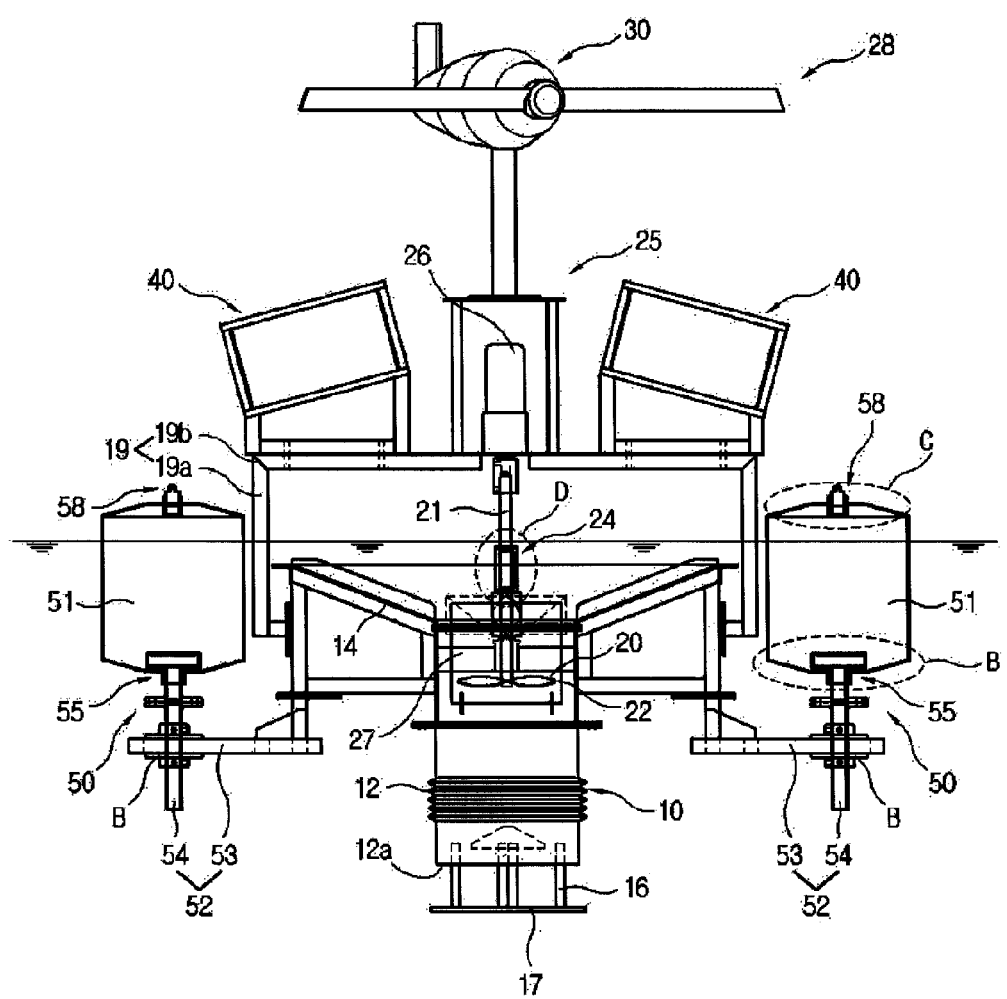
FIG. 2 is a side view taken along line A-A of FIG. 1.
Figure 3:
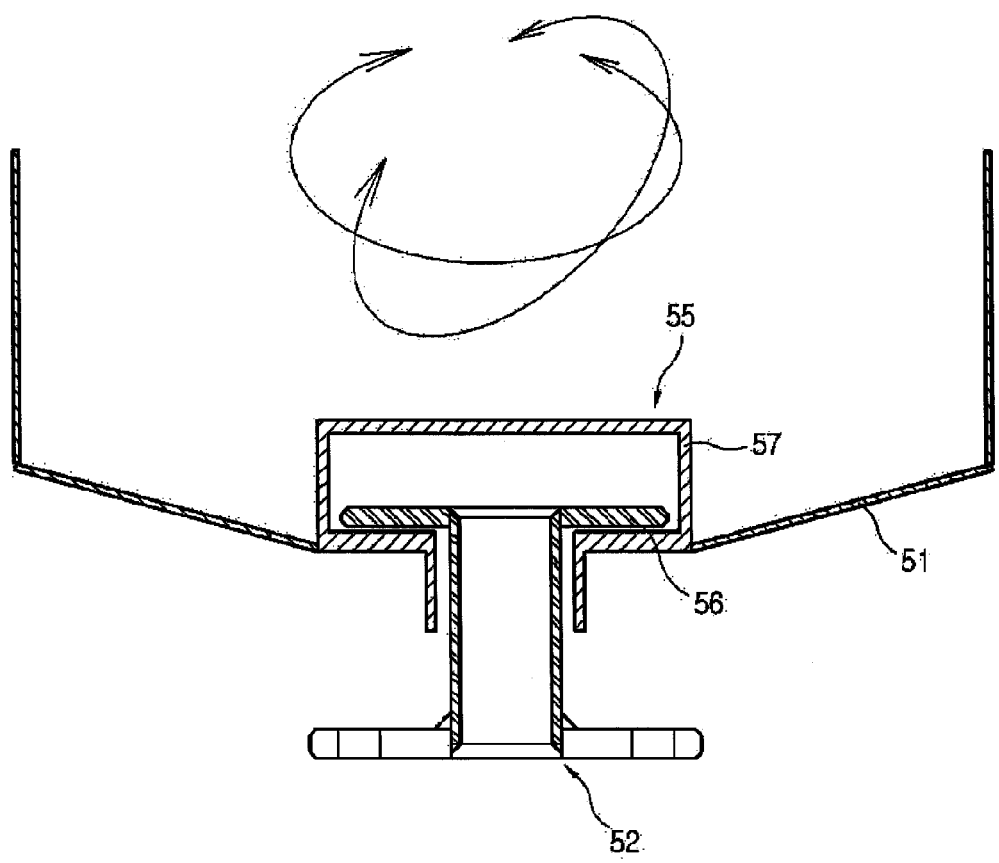
FIGS. 3 to 5 are enlarged views of parts B, C, and D of FIG. 2.
Figure 4:
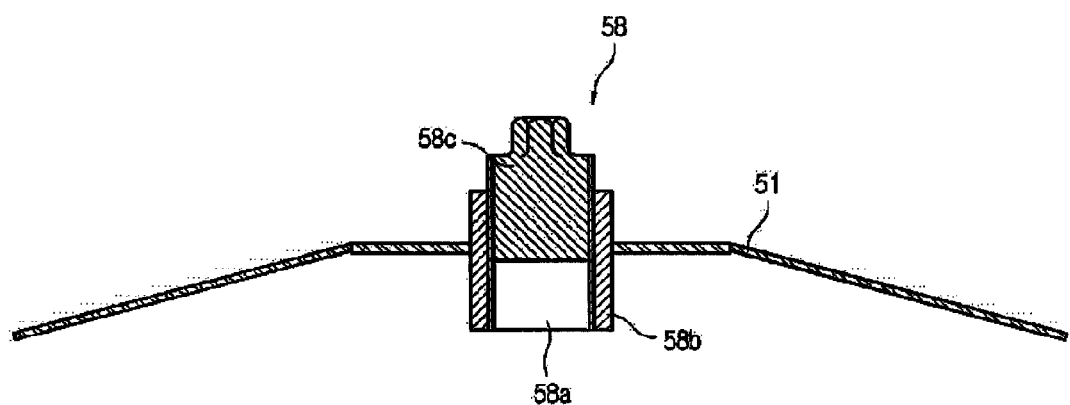
Figure 5:
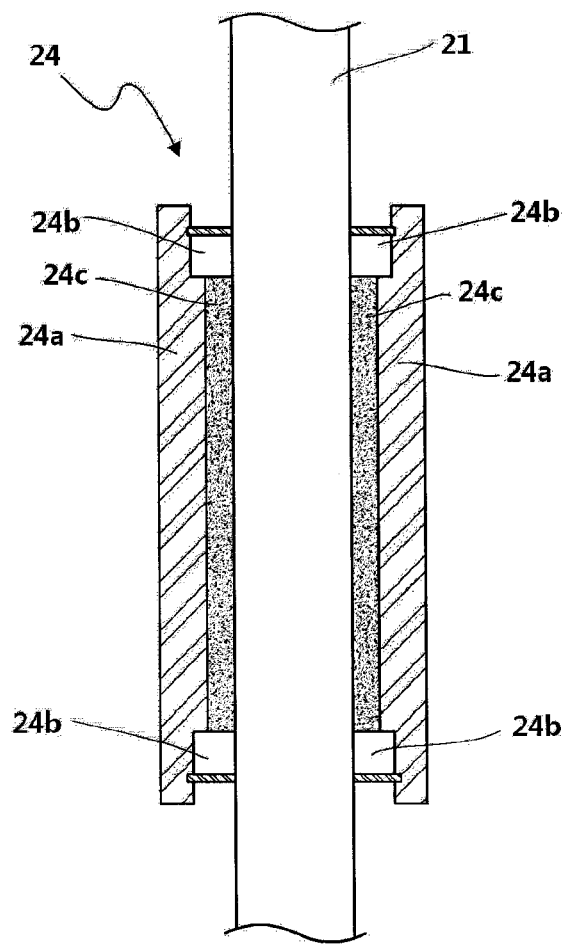
Figure 6:
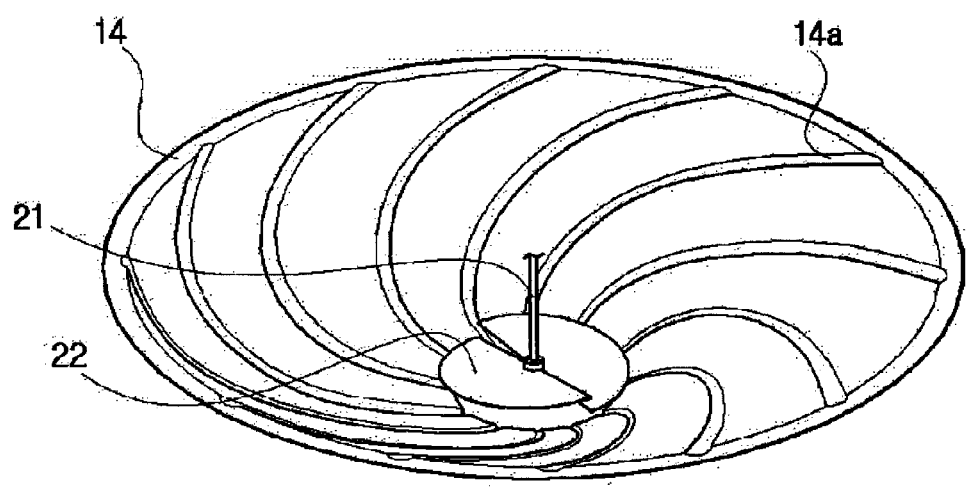
FIG. 6 is an enlarged perspective view showing a water disperser.
Figure 7:
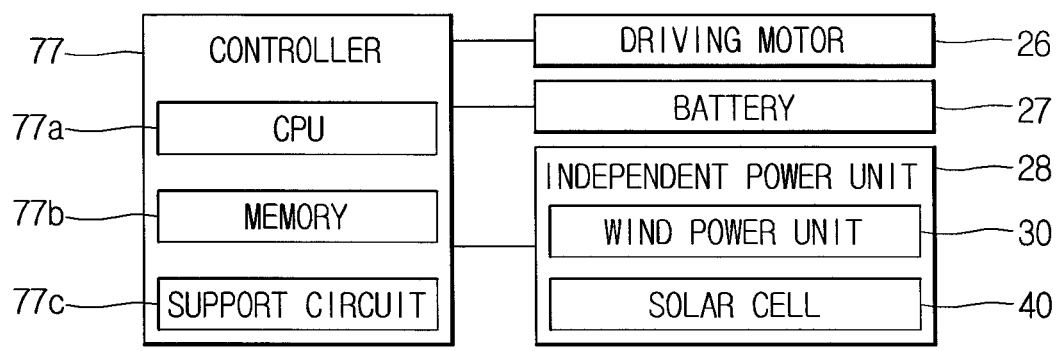
FIG. 7 is a control block diagram of the water circulating device.

FIG. 1 is a top view showing a water circulating device according to a first embodiment of the present invention. FIG. 2 is a side view taken along line A-A of FIG. 1. FIGS. 3 to 5 are enlarged views of parts B, C, and D of FIG. 2. FIG. 6 is an enlarged perspective view showing a water disperser. FIG. 7 is a control block diagram of the water circulating device.

As shown in these figures, the water circulating device using sunlight in a park or a lake in accordance with the present embodiment is intended to circulate water, which is stagnant at a lower stratum of a water area such as a river or a lake, to an upper stratum so as to improve a quality of water, and includes an expandable corrugated tube unit 10, a unit frame 19, a plurality of barge units 50, an impeller 20, and a torque provider 25.

The expandable corrugated tube unit 10 includes an expandable corrugated tube body 12 and a water disperser 14.

The expandable corrugated tube body 12 has the shape of a pipe and is disposed in a vertical direction of the water area.

The expandable corrugated tube body 12 is provided with an inlet 12a in a lower end thereof into which water stagnant at the lower stratum of the water area flows. A base plate 17 supporting the bellows pipe body 12 is supported at a lower portion of the inlet 12a by a plurality of legs 16. The base plate 17 and the plurality of legs 16 may be omitted as needed.

Considering that a depth of the water area is different, a vertical length of the expandable corrugated tube body 12 disposed in the vertical direction of the water area is favorably adjusted. Thus, the expandable corrugated tube body 12 of the present embodiment is provided in a bellows construction so that the vertical length thereof is adjustable. This is advantageous because the expandable corrugated tube body 12 can adaptively cope with both a deep water area and a shallow water area.

The water disperser 14 is provided at an upper portion of the expandable corrugated tube body 12 and serves to disperse the water supplied from the expandable corrugated tube body 12 to an upper stratum of the neighboring water area which corresponds to an upper portion of the expandable corrugated tube body 12.

As shown in FIG. 6, the water disperser 14 may have a dish shape so as to be able to easily disperse the water to the neighboring water area.

The water disperser 14 may be provided with a plurality of guide blades 14a on a top surface thereof. The guide blades 14a are not essentially provided. However, if the guide blades 14a are provided as in FIG. 6, the water supplied upward along the expandable corrugated tube body 12 can be spirally rotated by the guide blades 14a again and be dispersed or dispersed outside the water disperser 14. As such, the guide blades may be additionally advantageous in obstructing interference, collision, or eddies in the water.

The unit frame 19 is a structure that supports the expandable corrugated tube unit 10. As shown in FIG. 2, the unit frame 19 may include a lower frame 19a and an upper frame 19b depending on its position.

The lower frame 19a supports the expandable corrugated tube unit 10 at a side of the bellows pipe unit 10, and the upper frame 19b supports upper structures, for instance a wind power unit 30 and solar cells 40, above the expandable corrugated tube unit 10.

The barge units 50 are radially connected outside the unit frame 19 around the expandable corrugated tube body 10 and serve to provide buoyancy to the expandable corrugated tube unit 10 the unit frame 19.

In other words, the barge units 50 function to float the water circulating device of the present embodiment in the water. The barge units 50 may be symmetrically provided in pairs. However, in the present embodiment, to provide stable buoyancy, three barge units 50 are radially provided. Thus, the three barge units 50 have the same structure. Of course, since the scope of the present invention does not need to be limited thereto, four or more barge units 50 may be provided.

As shown in FIGS. 2 and 3, each of the barge units 50 includes a floating tank 51 that has a tub structure and provides a substantial buoyancy, a barge unit support 52 that is connected to the unit frame 19, and a free rotor 55 that is provided on a region where the floating tank 51 and the barge unit support 52 are connected and freely rotates the floating tank 51 relative to the barge unit support 52.

In the present embodiment, the floating tank 51 is manufactured in a cylindrical or conical structure. Air or water is filled in the floating tank 51 in order to adjust the buoyancy of the floating tank 51 with respect to water.

The barge unit support 52 includes a transverse bracket 53 connected to the unit frame 19 in a transverse direction and a tank connecting shaft 54 connected to the unit frame 19 in a longitudinal direction. The tank connecting shaft 54 may be connected so as to be rotatable relative to the transverse bracket 53 by a bearing B.

The free rotor 55 includes a disk 56 provided at an upper end of the tank connecting shaft 54 and a rotary housing 57 that is connected to the floating tank 51 at a lower end of the floating tank 51 so as to prevent separation of the disk 56 and is rotatable relative to the disk 56. Of course, this is merely one example. As such, in place of the disk 56, a ball bearing structure or a ball joint structure may be applied.

In this way, when the floating tank 51 can be freely rotated by the free rotor 55, which is advantageous to the water circulating device of the present embodiment, in that it helps maintain balance even in the case of a typhoon or a violent wave. Particularly, it is possible to inhibit a flexure or cutting phenomenon caused by an unbalanced load that is applied to the floating tank 51 or structures supporting the floating tank, due to wind force generated from a wind and water power generated from waves. Thus, it is possible to use the water circulating device of the present embodiment for a long period due to improved stability.

Especially, in the case of the present embodiment, since the floating tank 51 can be freely rotated in the cylindrical or conical structure, and since the tank connecting shaft 54 itself is connected so as to be rotatable relative to the transverse bracket 53 by the bearing B, it is possible to properly prevent a phenomenon in which the water circulating device of the present embodiment is damaged or warped by external force such as a wind and a wave and thus is rendered unable to perform its normal function.

As shown in FIGS. 2 and 4, each barge unit 50 of the present embodiment is further equipped with a buoyancy adjustor 58 that is mounted on the floating tank 51 and adjusts the buoyancy of the floating tank 51.

The buoyancy adjustor 58 includes a socket 58b forming a water inlet 58a in the upper end of the floating tank 51 and a plug bolt 58c removably coupled to the socket 58b. The plug bolt 58c is opened, and a proper amount of water is injected through the water inlet 58a and is stored in the floating tank 51. Then, when the plug bolt 58c is closed, the level of buoyancy according to the amount of the injected water can be adjusted. In other words, the state in which the water circulating device of the present embodiment is floated can be adjusted.

In the water circulating device using sunlight, which is installed in a park or a lake, in accordance with the present embodiment, it is important to adjust its height with respect to the surface of water. In the prior art, such height adjustment has been attempted using a mechanical apparatus, but it has been difficult to set or maintain the height adjustment. This is, on one hand, why the height adjustment is performed on the water, and on the other hand why weight of the entire device is not completely balanced. Further, since the device becomes worn with the lapse of time, there is a need to additionally perform the height adjustment. In this case, it is not easy to perform new height adjustments.

In contrast, in the present embodiment, it is easy to set and maintain the height adjustment without introducing a separate complicated apparatus. In detail, the height adjustment can be easily set by adjusting a buoyant state of the floating tank 51 using the amount of the water injected through the buoyancy adjustor 58 mounted on the floating tank 51.

Since the height adjustment can be set according to the amount of the injected water in this way, the setting or management of the height adjustment can be very easily performed unlike the prior art. Further, since a complicated mechanical apparatus is not used, the water circulating device is easily manufactured and is efficient in terms of a cost.

The impeller 20 is rotatably disposed at the expandable corrugated tube unit 10 and serves to disperse the water in the expandable corrugated tube unit 10 to the outside of the expandable corrugated tube unit 10.

This impeller 20 includes a shaft 21 and dispersion blades 22 that are connected to the shaft 21 and disperse the water in a radial outward direction. Meanwhile, as shown in FIGS. 2 and 5, a deicer 24 is provided on one region of the shaft 21 as a means for preventing the rotation of the shaft 21 from being constricted by freezing in cold winter.

The deicer 24 includes a shaft housing 24a that is disposed on a radial outer side of the shaft 21 and protects the shaft 21 from the outside, retainers 24b that maintain an air tight gap between the shaft housing 24a and the shaft 21, and an anti-freezing filler 24c that is filled in a region between the shaft housing 24a and the shaft 21.

The shaft housing 24a may be formed of engineering plastic such as polyethylene (PE), polypropylene (PP), or Teflon that has a low change in temperature. The retainer 24b maintains an air tight gap between the shaft housing 24a and the shaft 21. The anti-freezing filler 24c may include grease, an anti-freezing solution, a thermal medium, or the like.

In this way, the shaft housing 24a is assembled by disposing the anti-freezing filler 24c on an outer surface of the shaft 21 and disposing the retainers 24b between the shaft housing 24a and the shaft 21. As such, even when water is frozen, the anti-freezing filler 24c is provided inside the shaft housing 24a, and thus the shaft 21 is not in contact with the frozen water.

Accordingly, since a phenomenon in which the shaft 21 is frozen even in the coldest season, it is possible to guarantee smooth rotation of the shaft 21 at all times. When the water is actually frozen, only an upper stratum thereof is generally frozen. As such, when the shaft 21 is rotated, the water circulates under the upper stratum, and thus it is sufficient to improve a quality of water.

Finally, the torque provider 25 serves to provide the impeller 20 with torque in order to rotate the impeller 20.

This torque provider 25 includes a driving motor 26 that rotates the impeller 20, a battery 27 that supplies power for driving the driving motor 26, and an independent power unit 28 that generates electricity in itself and charges the battery 27.

In the present embodiment, the independent power unit 28 includes a plurality of solar cells 40 that generate electricity from solar energy based on sunlight or solar heat, and a wind power unit 30 that generates electricity from wind energy based on a wind.

Structures of each solar cell 40 and the wind power unit 30 are typically known, and thus their detailed description will be omitted. For reference, only the wind power unit 30 will be briefly described. The wind power unit 30 is to generate electricity with a wind force and may be rotated by an external wind. The wind power unit 30 is rotated by a wind, and torque thereof is transmitted to a generator (not shown) and a rotor (not shown) via a gearbox (not shown) and a coupler (only if needed). An electromotive force excited by rotation of the rotor is charged (stored). Techniques associated with the technical elements themselves for generating electricity with a wind force, for instance the gearbox, the coupler, and/or the generator, are not the gist of the present invention, and thus detailed description thereof will be omitted.

The torque provider 25 may be controlled by a controller 77. Here, although not shown in FIG. 2, the controller 77 is located at an adequate apparatus of the unit frame 19 and may be connected to the torque provider 25, the driving motor 26, or other components by wire and/or wireless.

The controller 77 controls a rotational speed or direction of the driving motor 26 that rotates the impeller 20 as well as various details such as an amount of charge that is charged into the battery 27 by the independent power unit 28 and operation displaying an abnormal situation.

The controller 77 performing this function will be described in brief. As shown in FIG. 7, the controller 77 includes a central processing unit (CPU) 77a, a memory 77b, and a support circuit 77c. The CPU 77a may be one of various computer processors that can be industrially applied to control the water circulating device of the present embodiment. The memory 77b is connected to the CPU 77a so as to cooperate with the CPU 77a. The memory 77b is a computer-readable recording medium and may be installed at a local or remote site. For example, the memory 77b may be at least one of a random access memory (RAM), a read-only memory (ROM), a floppy disk, a hard disk, and an arbitrary digital storage that are easily available. The support circuit 77c is connected to the CPU 77a so as to cooperate with the CPU 77a and supports a typical operation of the processor. The support circuit 77c may include a cache, a power supply, a clock circuit, an input/output circuit, and a sub-system.

For example, a process of controlling the rotational speed or direction of the driving motor 26 rotating the impeller 20, a situation process of charging the battery 27 by means of the independent power unit 28, and a series of processes of displaying an abnormal situation may be stored in the memory 77b. Typically, software routines may be stored in the memory 77b. The routines may also be stored or executed by another CPU (not shown). Such another CPU may be located at a site that is distant from the test handler.

It has been described that the processes of the present invention are executed by the software routines. At least some of the processes of the present invention may be executed by hardware. In this way, the processes of the present invention may be realized by software executed on a computer system, hardware such as an integrated circuit, or a combination of the software and the hardware.

After the water circulating device of the present embodiment having this constitution is disposed in a river or a lake as in FIG. 2, when the impeller 20 is operated, water that is located at a lower stratum is guided along the expandable corrugated tube body 12 by the rotation of the impeller 20, and is dispersed to an upper stratum of the neighboring water area corresponding to an upper region of the expandable corrugated tube body 12 through the water disperser 14. This process is frequently or repetitively performed and can contribute to the improvement of water quality according to this circulating structure of water.

Particularly, in the case of the present embodiment, since the rotation of the impeller 20 is performed by independent power generation, separate power consumption is not required. Thus, the water circulating device can be semi-permanently used. Further, since the deicer 24 is applied to the shaft 21 of the impeller 20, and if the surface of water is frozen, it is possible to ensure the rotation of the impeller 20 to circulate the water regardless of the freezing.

As described above, since the free rotor 55 is provided for the barge unit 50, it is possible to inhibit a flexure or cutting phenomenon caused by an unbalanced load that takes place at the floating tank 51 or the structures supporting the floating tank due to wind force generated from a wind and water power generated from waves. The buoyancy of the floating tank 51 can be easily adjusted by the buoyancy adjustor 58.

In this way, according to the present embodiment, as the water circulating device circulates the water in a simple structure, it can contribute to the improvement of water quality.

Figure 8:
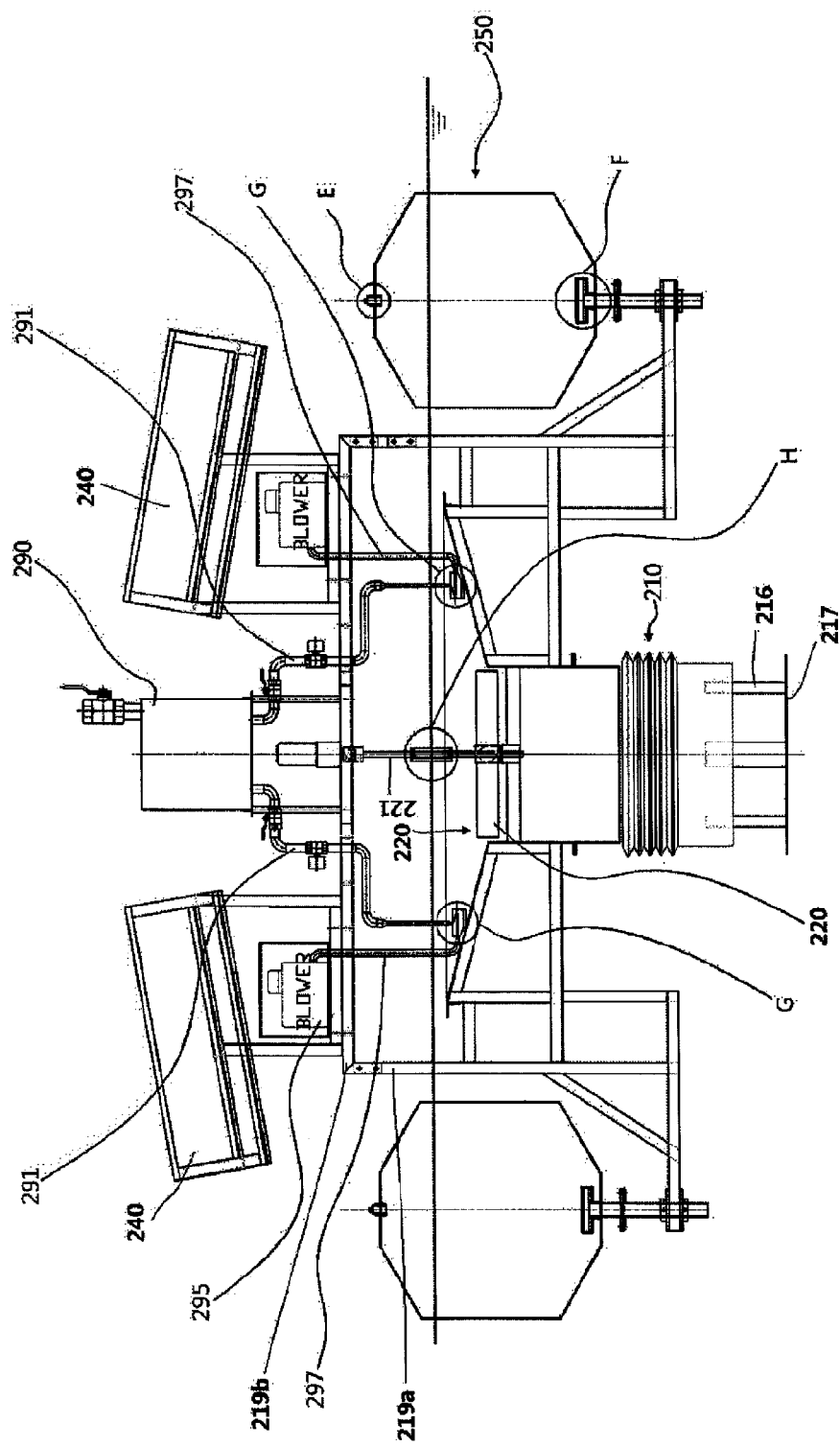
FIG. 8 is a side view showing a water circulating device that uses sunlight and is installed a park or a lake in accordance with a second embodiment of the present invention.

FIG. 8 is a side view showing a water circulating device that uses sunlight and is installed in a park or a lake in accordance with a second embodiment of the present invention.

The water circulating device of the embodiment of FIG. 8 is similar to that of the aforementioned embodiment in that an expandable corrugated tube unit 214 having an expandable corrugated tube body and a water disperser, a unit frame 219, an impeller 220 having a shaft 221 and dispersion blades 222, a battery (not shown), a wind power unit (not shown), solar cells 240, barge units 250, a base plate 217, and a controller (not shown), except positions and shapes thereof. Here, although not shown, the battery and the controller may be located at proper sites of the unit frame 219.

Further, the present embodiment also includes a buoyancy adjustor E, a free rotor F, and a deicer, functions of which are identical as in the aforementioned embodiment and thus will be omitted herein.

Meanwhile, the embodiment of FIG. 8 is different from the aforementioned embodiment in that an apparatus for automatically supplying a water purifying agent is provided. In the prior art, a method of introducing the water purifying agent into a water area is carried out by pouring the water purifying agent into a specific place of the water area. This method has a problem in that the water purifying agent is not uniformly distributed in the water area. In contrast, the water circulating device according to the embodiment of the present invention has a function of pumping up water from a lower stratum to an upper stratum of the water area so as to circulate the water, and thus can effectively distribute the water purifying agent to the water area when this function is used.

For example, the water circulating device according to the present embodiment further includes a water purifying agent tank 290, a water purifying agent injection passage 291, a nozzle G, and a blower 295. At least one water purifying agent tank 290 may be provided and contains the water purifying agent. The water purifying agent tank 290 may have a port that can supplement the water purifying agent when the water purifying agent is deficient, and a port that can drain the water purifying agent to the water purifying agent injection passage 291. Constitutions of the ports can be easily realized by those skilled in the art, and thus detailed description thereof will be omitted.

The water purifying agent drained through the water purifying agent injection passage 291 may be discharged through the nozzle G. The nozzle G according to one embodiment of the present invention may drain the water purifying agent to the vicinity of the impeller 220 using air supplied from the blower 295. Thereby, the water purifying agent can be uniformly distributed between the upper and lower strata by rotation of the impeller 220.

According to one embodiment of the present invention, the water purifying agent injection passage 291 is provided with an on/off valve (not shown). Only when the valve is turned on, the water purifying agent can be discharged from the water purifying agent tank 290. The valve may be manually operated by the hand of a user or be an automatic valve controlled by the controller (not shown). The valve is not necessarily used, and thus may be employed according to an installed environment.

The blower 295 may supply air to the nozzle G via an air injection passage 297. Here, the nozzle G has a structure in which the water purifying agent is drained toward the water area by the air supplied from the blower 295. An operation of the blower 295 may be controlled by the controller (not shown). For example, the controller turns on the valve installed on the water purifying agent injection passage 291 and simultaneously operates the blower 295. Only when the water purifying agent is introduced toward the nozzle G, can the controller operate the blower 295.

Figure 9:
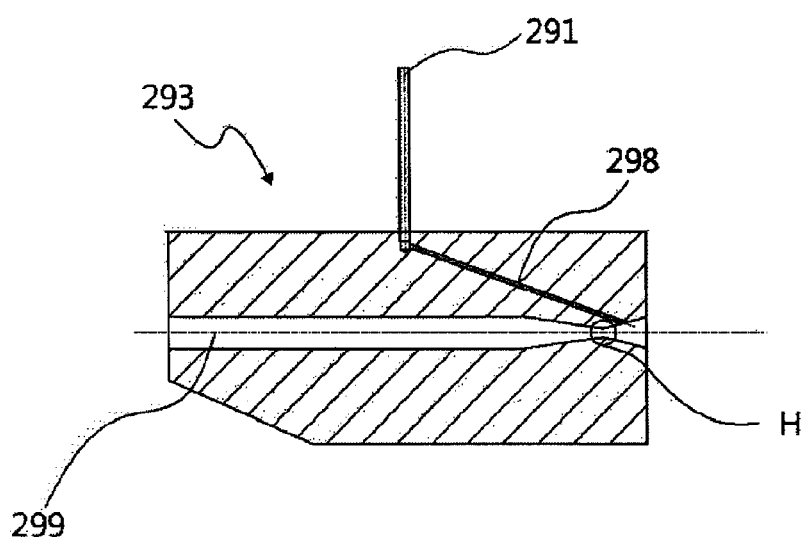
FIG. 9 is a cross-sectional view showing a nozzle for introducing a water purifying agent in accordance with one embodiment of the present invention.

FIG. 9 is a cross-sectional view showing a nozzle for introducing a water purifying agent in accordance with one embodiment of the present invention.

Referring to FIG. 9, the nozzle 293 may include an air inlet 299 and a water purifying agent inlet 298. The water purifying agent inlet 298 may receive the water purifying agent from the water purifying agent injection passage 291. The air inlet 299 may receive the air from the air injection passage 297.

As shown in FIG. 9, the water purifying agent inlet 298 and the air inlet 299 have a structure in which they meet each other and thus the air and the water purifying agent are joined just before the air is discharged to the outside of the nozzle G. Preferably, to increase a speed of the air, the air inlet 299 may have a constitution H in which a dimension thereof is reduced and then increased before the air and the water purifying agent are joined. As the air and the water purifying agent are joined at a place where the dimension of the air inlet 299 is reduced and then increased, the effect of the nozzle can be efficiently achieved. The specific constitution of the nozzle is illustrative. Thus, it is apparent that a nozzle having a different constitution may be employed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water circulating device installed in a park or a lake, comprising:
    an expandable corrugated tube unit having an expandable corrugated tube body that is provided so as to be able to adjust a length thereof in a vertical direction of a water area, has at least one inlet into which water located at a lower stratum of the water area flows, and is formed in a pipe shape, and a water disperser that is provided at an upper portion of the expandable corrugated tube body and disperses the water supplied from the expandable corrugated tube body to an upper stratum of an neighboring water area corresponding to an upper region of the expandable corrugated tube body;
    a unit frame supporting the expandable corrugated tube unit;
    a plurality of barge units that are radially connected outside the unit frame around the expandable corrugated tube body and provide buoyancy to the expandable corrugated tube unit and the unit frame;
    an impeller that is rotatably disposed at the expandable corrugated tube unit and disperses the water in the expandable corrugated tube unit to outside of the expandable corrugated tube unit; and
    a torque provider providing torque to the impeller,
    wherein the impeller includes a shaft having a deicer on at least one region and dispersion blades that are connected to the shaft and disperse the water in a radial outward direction, and each of the barge units includes a floating tank that has a tub structure and provides a substantial buoyancy, a barge unit support that is connected to the unit frame, and a free rotor that is provided on a region where the floating tank and the barge unit support are connected and freely rotates the floating tank relative to the barge unit support,
    wherein the floating tank is manufactured in a cylindrical or conical structure, and the barge unit support includes a transverse bracket connected to the unit frame in a transverse direction and a tank connecting shaft connected to the transverse bracket in a longitudinal direction,
    wherein the free rotor includes a disk provided at an upper end of the tank connecting shaft and a rotary housing that is connected to the floating tank at a lower end of the floating tank so as to prevent separation of the disk and is rotatable relative to the disk.

2. The water circulating device of claim 1, wherein the tank connecting shaft is connected so as to be rotatable relative to the transverse bracket by a bearing.

3. The water circulating device of claim 2, further comprising a water purifying agent tank containing a water purifying agent, and a water purifying agent injection passage that is connected to the water purifying agent tank and receives and discharges the water purifying agent contained in the water purifying agent tank.

4. The water circulating device of claim 1, wherein each of the barge units further includes a buoyancy adjustor that is provided for the floating tank and adjusts the buoyancy of the floating tank.

5. The water circulating device of claim 4, wherein the buoyancy adjustor includes a socket forming a water inlet in the upper end of the floating tank and a plug bolt removably coupled to the socket.

6. The water circulating device of claim 5, wherein the deicer includes a shaft housing that is disposed on a radial outer side of the shaft and protects the shaft from an outside, retainers that maintain an air tight gap between the shaft housing and the shaft, and an anti-freezing filler that is filled in a region between the shaft housing and the shaft.

7. The water circulating device of claim 6, further comprising a water purifying agent tank containing a water purifying agent, and a water purifying agent injection passage that is connected to the water purifying agent tank and receives and discharges the water purifying agent contained in the water purifying agent tank.

8. The water circulating device of claim 5, further comprising a water purifying agent tank containing a water purifying agent, and a water purifying agent injection passage that is connected to the water purifying agent tank and receives and discharges the water purifying agent contained in the water purifying agent tank.

9. The water circulating device of claim 4, further comprising a water purifying agent tank containing a water purifying agent, and a water purifying agent injection passage that is connected to the water purifying agent tank and receives and discharges the water purifying agent contained in the water purifying agent tank.

10. The water circulating device of claim 9, wherein the water purifying agent discharged through the water purifying agent injection passage is discharged toward the impeller.

11. The water circulating device of claim 9, further comprising a blower supplying air, a water purifying agent inlet that is connected to the water purifying agent injection passage and receives the water purifying agent, and a nozzle that is connected to the blower and has an air inlet receiving the air, wherein the water purifying agent flowing into the water purifying agent inlet is discharged by the air introduced by the air inlet.

12. The water circulating device of claim 1, further comprising a water purifying agent tank containing a water purifying agent, and a water purifying agent injection passage that is connected to the water purifying agent tank and receives and discharges the water purifying agent contained in the water purifying agent tank.

13. The water circulating device of claim 12, wherein the water purifying agent discharged through the water purifying agent injection passage is discharged toward the impeller.

14. The water circulating device of claim 12, further comprising a blower supplying air, a water purifying agent inlet that is connected to the water purifying agent injection passage and receives the water purifying agent, and a nozzle that is connected to the blower and has an air inlet receiving the air, wherein the water purifying agent flowing into the water purifying agent inlet is discharged by the air introduced by the air inlet.

\* \* \* \* \*